United States Patent
Tsukamoto et al.

(10) Patent No.: US 7,417,878 B2
(45) Date of Patent: Aug. 26, 2008

(54) DISTRIBUTED POWER SUPPLY AND METHOD OF RECOVERING FROM ERROR

(75) Inventors: Keiichiro Tsukamoto, Kawasaki (JP); Hideaki Arao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 11/498,858

(22) Filed: Aug. 4, 2006

(65) Prior Publication Data
US 2007/0230225 A1    Oct. 4, 2007

(30) Foreign Application Priority Data
Mar. 30, 2006    (JP) .............................. 2006-095543

(51) Int. Cl.
*H02M 7/5375* (2006.01)
(52) U.S. Cl. ........................ 363/49; 363/65; 323/267; 323/901
(58) Field of Classification Search ................ 323/267, 323/268, 272, 901; 363/49, 65
See application file for complete search history.

(56) References Cited
U.S. PATENT DOCUMENTS 5,262,933 A * 11/1993 Shyi-Hon .................... 363/49
5,267,135 A * 11/1993 Tezuka et al. ................ 363/49
5,532,914 A *  7/1996 Kageyama et al. ........... 363/50
6,738,268 B1 *  5/2004 Sullivan et al. .............. 363/49
7,009,369 B2 *  3/2006 Ni et al. ..................... 323/267
7,023,187 B2 *  4/2006 Shearon et al. ............. 323/266

FOREIGN PATENT DOCUMENTS

| JP | 2002-035244 | 2/2002 |
| JP | 2004-109056 | 4/2004 |

* cited by examiner

*Primary Examiner*—Jeffery L Sterrett
(74) *Attorney, Agent, or Firm*—Staas & Halsey LLP (57) ABSTRACT

A distributed power supply is incorporated in a device including a plurality of PCB. An on-board power supply is provided in the distributed power supply. The on-board power supply individually supplies a secondary power to each PCB using a primary power. Each PCB includes a primary power supply monitoring circuit, a PCB internal power supply monitoring circuit, and a pulse generation circuit. The primary power supply circuit detects an abnormality in the voltage of in the primary power supplied to the on-board power supply. The PCB internal power supply monitoring circuit restarts the PCB when the abnormality is detected. The pulse generation circuit transmits a restart signal to the other PCBs in the device.

12 Claims, 9 Drawing Sheets

FIG.7B ized power supply method, the power supply is centralized in one location. In the distributed power supply method, the power is supplied to individual PCBs. The distributed power supply method includes an on-board power supply, provided in each PCB. Each PCB provides one wiring for a primary power supply of the on-board power supply. Each PCB monitors a power status, individually.

DISTRIBUTED POWER SUPPLY AND METHOD OF RECOVERING FROM ERROR

CROSS-REFERENCE TO RELATED APPLICATIONS

This application is based upon and claims the benefit of priority from the prior Japanese Patent Application No. 2006-095543, filed on Mar. 30, 2006, the entire contents of which are incorporated herein by reference.

BACKGROUND OF THE INVENTION

1. Field of the Invention

The present invention relates to a technology of a distributed power supply having plural power supply sections in a device.

2. Description of the Related Art

Transmission devices in recent years are integrated in high density to provide various services. As a result, power consumption of the transmission device has increased. Device configurations are required to be flexibly changeable depending on various service forms, to provide various client services. To realize that, the device is structured with a control system to control the overall device and a controlled system to provide the services. According to the configuration, changes in the service forms can be handled flexibly. For example, when a different service form is required, only the controlled system is required to be exchanged. Furthermore, a new service can be added even while the device is in operation.

The control system and the controlled system further facilitate function changes and exchanges by using printed circuit boards (PCB) prepared for each function. Each PCB providing a service requires a different power voltage and a different electric current, due to differences in functions and the like. The power consumption of the transmission device has been rising and more transmission devices have individual PCBs. Therefore, implementation of a distributed power supply method, rather than a conventional centralized power supply method, to supply power is increasingly used. In the centralized power supply method, the power supply is centralized in one location. In the distributed power supply method, the power is supplied to individual PCBs. The distributed power supply method includes an on-board power supply, provided in each PCB. Each PCB provides one wiring for a primary power supply of the on-board power supply. Each PCB monitors a power status, individually.

Figure 6:
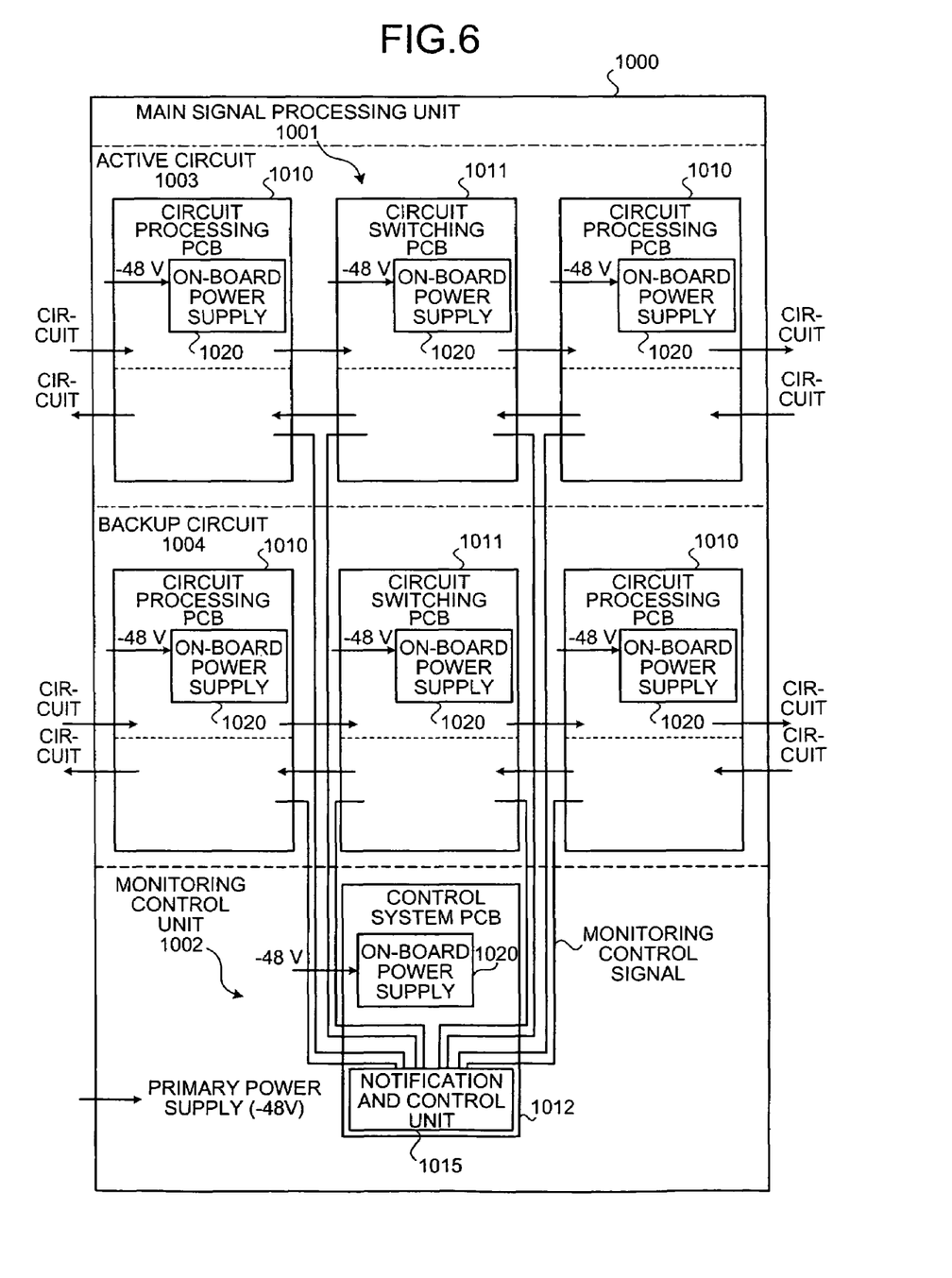
FIG. 6 is a block diagram of a conventional transmission device applying a distributed power supply method.

FIG. 6 is a block diagram of the transmission device using the distributed power supply method according to a conventional technology. A transmission device 1000 includes a main signal processing unit 1001 and a monitor control unit 1002. The main signal processing unit 1001 includes an active circuit 1003 and a backup circuit 1004. The active circuit 1003 and the backup circuit 1004 each include PCBs 1010 and 1011 for respectively different functions. A circuit processing PCB 1010 mainly converts an optical signal to an electric signal or converts the electric signal to the optical signal. A circuit switching PCB 1011 switches a main signal.

The primary power supply is supplied to the transmission device 1000 from an external source. The primary power supply is supplied to the on-board power supply 1020 of each of the PCB 1010, the PCB 1011, and the PCB 1012. The on-board power supply 1020 supplies a secondary power supply to the PCB 1010, the PCB 1011, and the PCB 1012, respectively.

A control system PCB 1012 within the monitor control unit 1002 includes a notification and control unit 1015. The control system PCB 1012 controls a conversion operation of the circuit processing PCB 1010 and controls a switching operation of the circuit switching PCB 1011 in the main signal processing unit 1001, using a monitor control signal. The control system PCB 1012 also performs an alarm notification to the outside when a circuit control is abnormal.

The PCB 1010, the PCB 1011, and the PCB 1012 individually monitor a primary power status. When the PCB 1010, the PCB 1011, or the PCB 1012 detects an occurrence of an abnormal state in the primary power supply, the PCB that detects the abnormal state individually performs a restarting process.

A conventional power supply includes a power supply unit. The power supply implements the centralized power supply method that supplies the secondary power supply to each PCB, and transmits a RESET signal to each PCB when an abnormal reduction in the power is detected (for example, Japanese Patent Laid-Open Publication No. 2002-35244).

A centralized power supply method in which power is collectively supplied to all PCBs causes waste or limits expandability in a transmission device including PCBs. If the transmission device has a controlled system that can correspond to changes in the services, power voltages and electric currents may become unnecessary because of the changes in services. If a PCB having a function corresponding to a new service is added, the power voltages or electric currents required by the PCB may not be provided. Moreover, power lines are required for each type of secondary power supply between a power supply unit of a centralized power supply and each PCB.

Figure 7A:
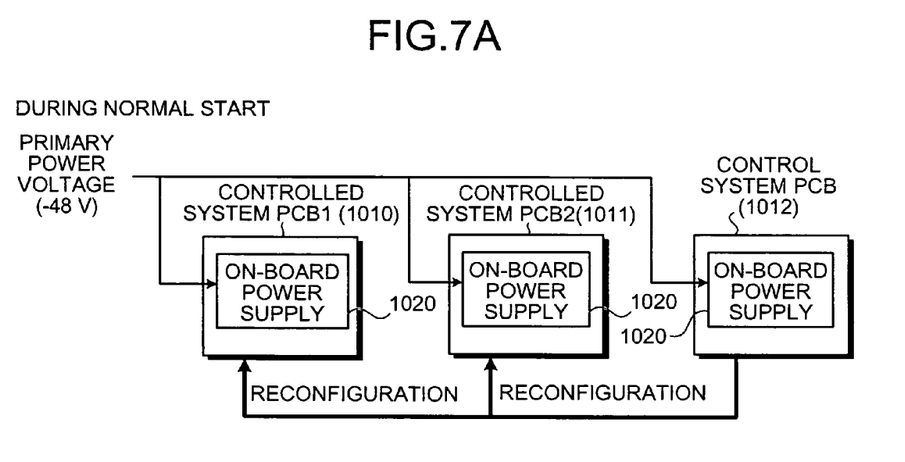
FIG. 7A is a schematic for illustrating a normal operation state in the distributed power supply method.

In addition, a normal recovery is often not performed after detection of a power supply abnormality in the distributed power supply method. FIG. 7A is a schematic for illustrating a normal operation state in the distributed power supply method. When an instantaneous interruption in the primary power supply occurs due to lightning damage or the like, only some of PCBs detect an abnormality in the primary power supply and restarts, because of differences in power lines within the device (differences in impedance and length) and individual differences between the PCBs. When the abnormality in the primary power supply is detected by the control system PCB 1012, as shown in FIG. 7A, the operation states of the restarted controlled system PCB 1010 and controlled system PCB 1011 are reconfigured and a service can be recovered, after the control system PCB 1012 is started.

Figure 7B:
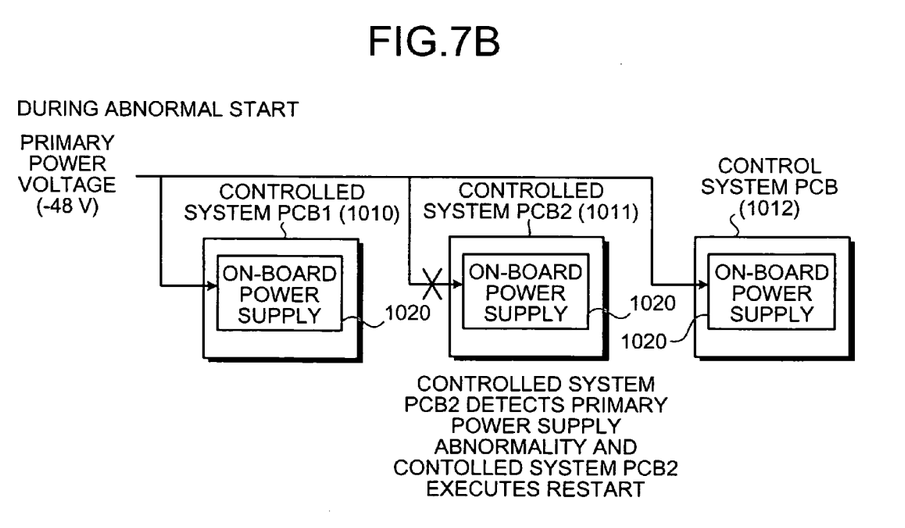
FIG. 7B is a schematic for illustrating an abnormal operation state in the distributed power supply method.

FIG. 7B is a schematic for illustrating an abnormal operation state in the distributed power supply method. When only the controlled system PCB 1011 detects the abnormality in the primary power supply and restarts, and the control system PCB 1012 cannot detect the restarting of the controlled system PCB 1011, the control system PCB 1012 does not reconfigure the operation states of a controlled system PCB 1010 and the controlled system PCB 1011 to an operation state for normal operations. Therefore, the restarted controlled system PCB 1011 cannot make a transition into a normal operation state, and the service remains unavailable.

In a primary power supply monitoring, a power supply interruption for duration equal to or more than a predetermined time (for example, 1 millisecond (ms)) is always detected and the entire device is stopped. At the time of the power supply interruptions for duration less than a detectable time (for example, 51.2 microseconds (µs)), the device cannot be stopped due to circuit limitations and the like. When an instantaneous interruption for duration from the detectable time to the predetermined time occurs, whether each PCB stops depends on individual differences caused by capacitor elements and the like of each PCB. Therefore, some PCBs stop and restart, but some PCBs do not stop and continue running.

Figure 8:
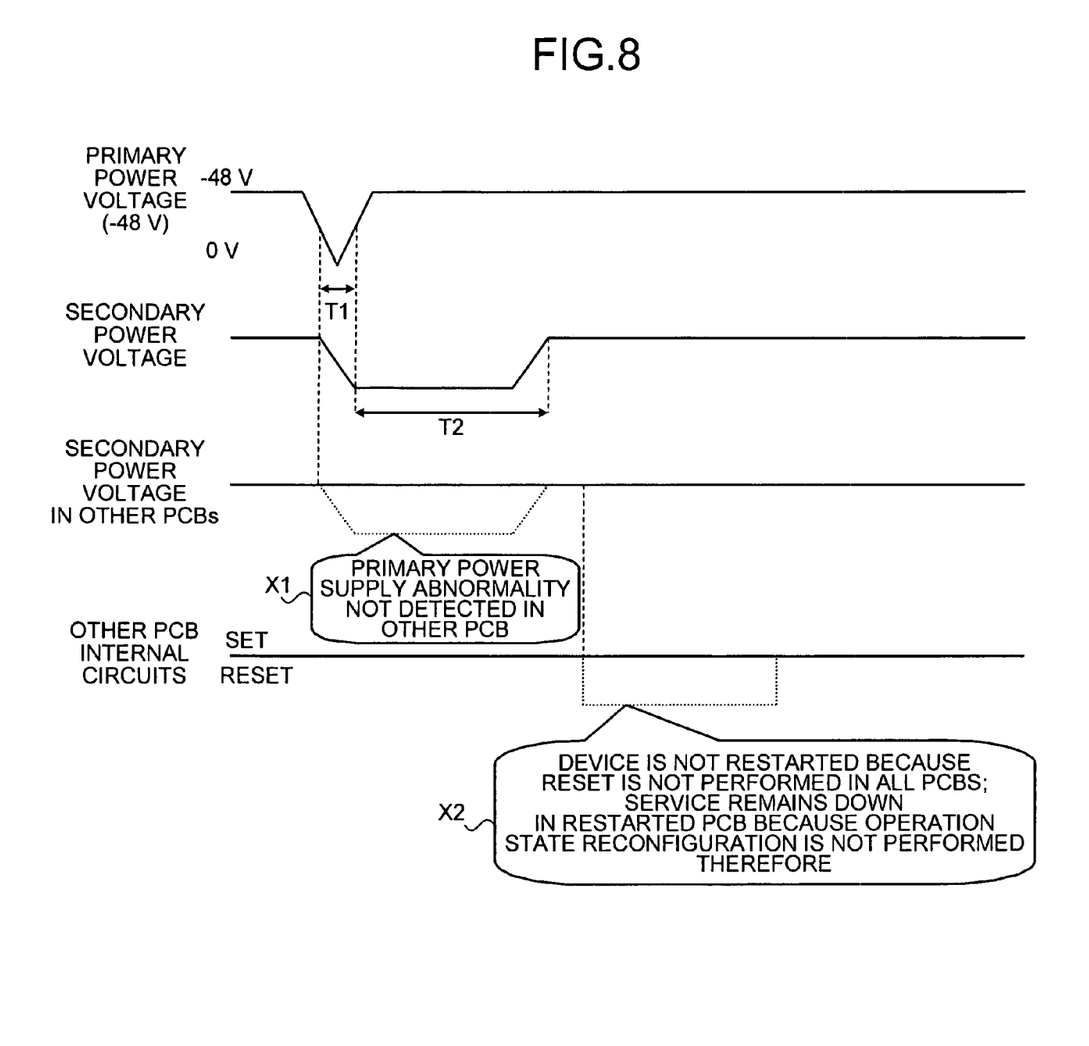
FIG. 8 is a timing chart for explaining an operation of the conventional distributed power supply at the time of detection of an instantaneous power interruption.

FIG. 8 is a timing chart for explaining an operation when the instantaneous interruption is detected in the conventional technology. When the instantaneous interruption occurs in the primary power supply (primary power voltage) for a time (T1) that is equal to or more than the detectable time and less than the predetermined time, the PCB detects the instantaneous interruption, supplies a secondary power supply (after an elapse of on-board power supply 1020 restart time T2, for example, T2=161 ms to 507 ms) normally, and supplies power. However, if the instantaneous interruption (primary power supply abnormality) is undetected by another PCB (X1), reset is not performed in the other PCB (X2). If the other PCB is the control PCB, the device does not restart and the operation state of the restarted PCB is not reconfigured. Therefore, the service remains unavailable in the restarted PCB. If the restarted PCB is disposed in an active circuit for communication, communication service remains unavailable even though the power supply being recovered.

To prevent the problem, an implementation of a method can be considered, in which the control PCB individually monitors a restart status of each PCB. However, in this case, each controlled system PCB is required to notify the control system PCB of the operation state via a dedicated monitor control line. Therefore, the control PCB is required to provide the dedicated monitor control line for each controlled PCB. In this case, unnecessary wirings may be formed depending on the configuration of the controlled system PCB. Wirings may also become insufficient when the number of PCB to be additionally monitored changes. In this method in which the control system PCB individually monitors each PCB, circuits and wirings tend to be wasted. Furthermore, the circuit size for monitoring tends to increase, expandability of diversion and the like becomes limited, and the monitoring becomes inefficient.

In the technology disclosed in the Japanese Laid-open Patent Publication No. 2002-35244, the abnormal power supply reduction is monitored only in the power supply unit. This is effective for monitoring the power voltage of the primary power supply, from the outside of the device to the power supply unit, and the secondary power supply in the power supply unit. A system reset is also possible. However, the power supply reaching the PCB that provides a service cannot be monitored. Therefore, as described above, only some of PCBs may restart when an instantaneous interruption in the primary power supply occurs due to lightning damage or the like, because of the differences in the power lines within the device and individual differences between the PCB. The restarted PCB cannot make a transition into the normal operation state and the service remains unavailable. For example, if only a voice control PCB is restarted, the control system PCB cannot detect the restart. Therefore, the system reset of the entire device remains uncontrolled.

SUMMARY OF THE INVENTION

It is an object of the present invention to at least solve the above problems in the conventional technologies.

A distributed power supply according to one aspect of the present invention is incorporated in a device including a plurality of units. The distributed power supply includes an on-board power supply configured to individually supply a secondary power to each of the units using a primary power supplied to the on-board power supply; an abnormality detecting unit configured to detect abnormality in a voltage of the primary power; a restarting unit configured to restart a corresponding unit when the abnormality detecting unit detects the abnormality; and a transmitting unit configured to transmit a restart signal to other units when the abnormality detecting unit detects the abnormality.

A method according to another aspect of the present invention is of recovering a distributed power supply from an error. The distributed power supply is incorporated in a device including a plurality of units, and including an on-board power supply configured to individually supply a secondary power to each of the units using a primary power supplied to the on-board power supply. The method includes detecting abnormality in a voltage of the primary power; restarting a corresponding unit when the abnormality is detected at the detecting; and transmitting a restart signal to other units when the abnormality is detected at the detecting abnormality.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to the accompanying drawings.

Figure 1:
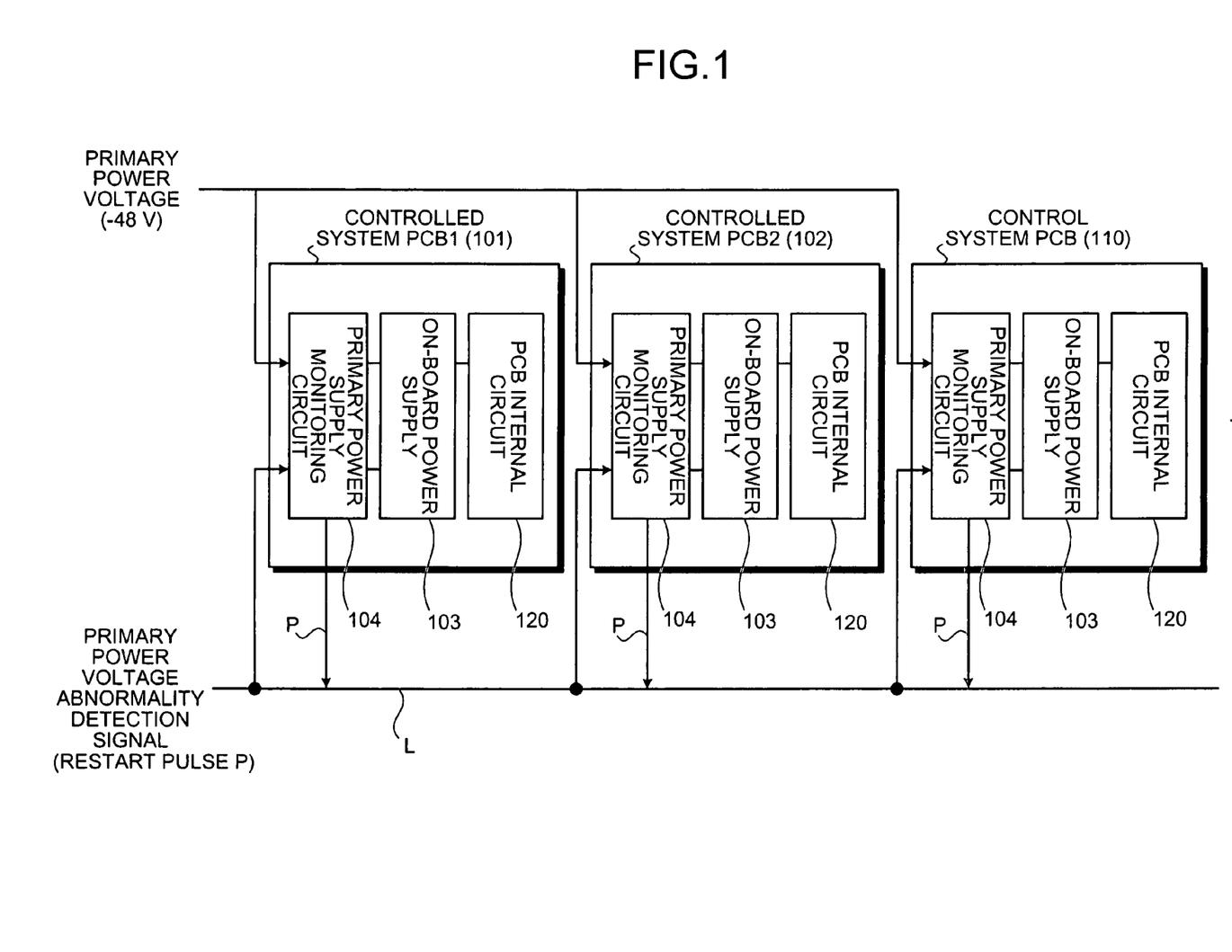
FIG. 1 is a block diagram of a distributed power supply according to an embodiment of the present invention.

FIG. 1 is a block diagram of a distributed power supply according to an embodiment of the present invention. The distributed power supply is installed in a transmission device and includes controlled system PCB1 (101), PCB2 (102), . . . that provide services, and a control system PCB 110 that monitors and controls the controlled system PCB1 and the controlled system PCB2. Each PCB shown in FIG. 1 can be exchangeable as a function-specific unit.

A single primary power supply (−48 volts (V)) is supplied to the transmission device from an external source. The PCB 101, the PCB 102, and the PCB 110 each include an on-board power supply 103. Power voltage required in a PCB internal circuit 120 is generated from the single power supply (−48 V) for each required electric current (power supply by a distributed power supply method). Because the distributed power supply method is implemented, the PCB 101, the PCB 102, and the PCB 110 each include a primary power supply monitoring circuit 104. As a result, the primary power supply is monitored for each PCB 101, PCB 102, and PCB 110.

The primary power supply monitoring circuit 104 outputs (gives notification of) a restart pulse P to the external source when a PCB restart is performed due to an abnormality of the primary power supply. The restart pulse P functions as a primary power supply abnormality detection signal. The restart pulse P is input into (notification is given to) all PCBs 101, PCBs 102, and PCBs 110 within the transmission device, via an abnormality detection signal line L. The abnormality detection signal line L is a common line for all PCBs 101, PCBs 102, and PCBs 110 in the transmission device. Thus, when only one of PCBs (for example, PCB 101) detects the primary power supply abnormality to be restarted, based on this restart, all of the remaining PCBs 102 and PCBs 110 installed in the transmission device can also be restarted.

Figure 2:
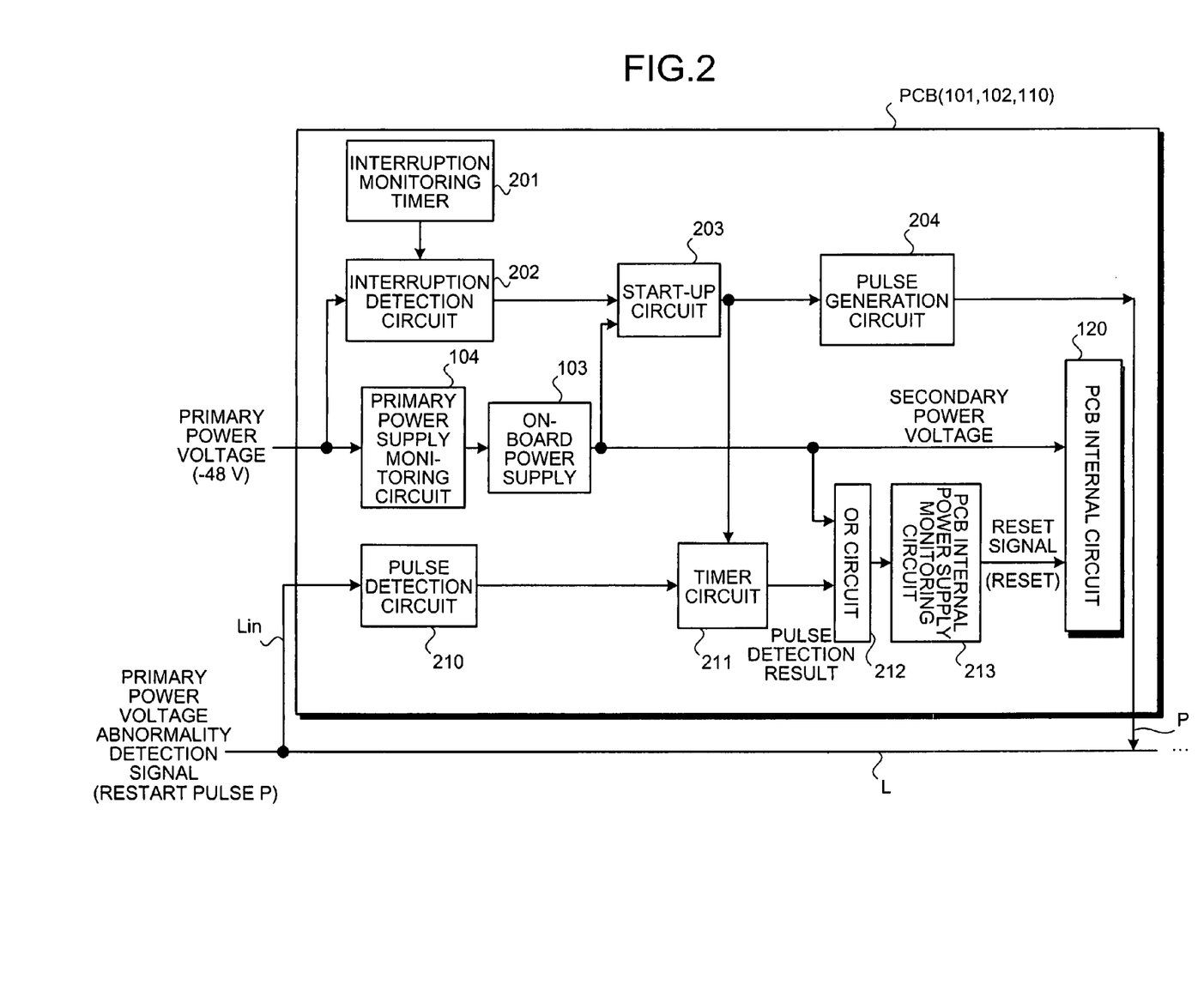
FIG. 2 is a block diagram of the distributed power supply provided in one PCB shown in FIG. 1.

FIG. 2 is a block diagram of a PCB included in the distributed power supply, shown in FIG. 1. The primary power supply (−48 V) supplied from outside is input into the primary power supply monitoring circuit 104. The primary power supply monitoring circuit 104 monitors the power voltage of the input primary power supply. If the power voltage of the primary power supply rises above a monitoring voltage, an electric current is supplied to the on-board power supply 103. On the other hand, if the power voltage of the input primary power supply falls below the monitoring voltage, the power supply to the on-board power supply 103 is stopped. Power supply circuits do not react to instantaneous interruptions less than an instantaneous interruption detectable time (for example, 51.2 μs), and the power supply interruption is not detected. Therefore, these instantaneous interruptions are not regarded as instantaneous interruptions, and operations are continued.

The on-board power supply 103 supplies the required power voltage to the PCB internal circuit 120, accordingly, from the primary power supply supplied via the primary power supply monitoring circuit 104. The interruption monitor timer 201 sets a timer duration. The timer duration is used to detect the power supply interruption (ordinary interruption, described later) that occurs per unit of time (for example, if the instantaneous interruption is 50 μs to 1 ms, a duration that equal to or longer than the instantaneous interruption, such as 2 ms). The interruption monitoring timer 201 provides the timer duration to an interruption detection circuit 202. When the power supply interruption that is equal to or longer than the timer duration set in the interruption monitoring timer 201 occurs in the supplied primary power supply, the interruption detection circuit 202 notifies a start-up circuit 203 of the power supply interruption detection result.

The start-up circuit 203 monitors a start-up status of the on-board power supply 103. Based on the detection result of the power interruption by the interruption detection circuit 202 and the monitoring of the start-up status, the start-up circuit 203 notifies a pulse generation circuit 204 of the power supply abnormality detection pulse generation instruction or gives no instruction to the pulse generation circuit 204. The power supply abnormality detection pulse generation instruction is an instruction to generate a pulse upon detection of the power supply abnormality. During the notification of the pulse generation instruction, a timer circuit 211 is simultaneously notified of a pulse reception disable instruction. The pulse generation circuit 204 generates the restart pulse P as the primary power supply abnormality detection signal, based on the power supply abnormality detection pulse generation instruction from the start-up circuit 203. Then, the pulse generation circuit 204 transmits the restart pulse P to the abnormality detection signal line L. The pulse generation circuit 204 functions as a restart signal transmitting unit that transmits the restart pulse to another PCB.

The restart pulse P that is the primary power supply abnormality detection signal from another PCB is input into a pulse detection circuit 210, via an input line Lin connected to the abnormality detection signal line L. The pulse detection circuit 210 detects the restart pulse P from the other PCB and notifies the timer circuit 211 of the detection result. The timer circuit 211 receives the pulse reception disable instruction from the start-up circuit 203 and the detection result from the pulse detection circuit 210. Then, the timer circuit 211 starts the timer upon detection of the restart pulse P. After the elapse of a predetermined timer duration T3, set in advance, the timer circuit 211 transmits the detection result of the restart pulse P to an OR circuit 212. The timer duration T3 of the timer circuit 211 is set to a duration that exceeds a restart time T2 of the on-board power supply 103, for example, 508 milliseconds or more, to prevent a restart caused by the restart pulse output from the PCB.

The OR circuit 212 monitors a secondary power voltage status of the on-board power supply 103 and calculates a logical OR of the secondary power voltage status and the detection result of the restart pulse P. Then, the OR circuit 212 notifies a PCB internal power supply monitoring circuit 213 of the calculation result. The PCB internal power supply monitoring circuit 213 monitors the power voltage of a secondary power supply supplied to the PCB internal circuit 120 and outputs a reset signal (RESET) that resets the PCB internal circuit 120, based on the calculation result from the OR circuit 212. The PCB internal power supply monitoring circuit 213 outputs the reset signal when the secondary power voltage of the on-board power supply 103 is interrupted and when the restart pulse P is input from the outside.

Figure 3A:
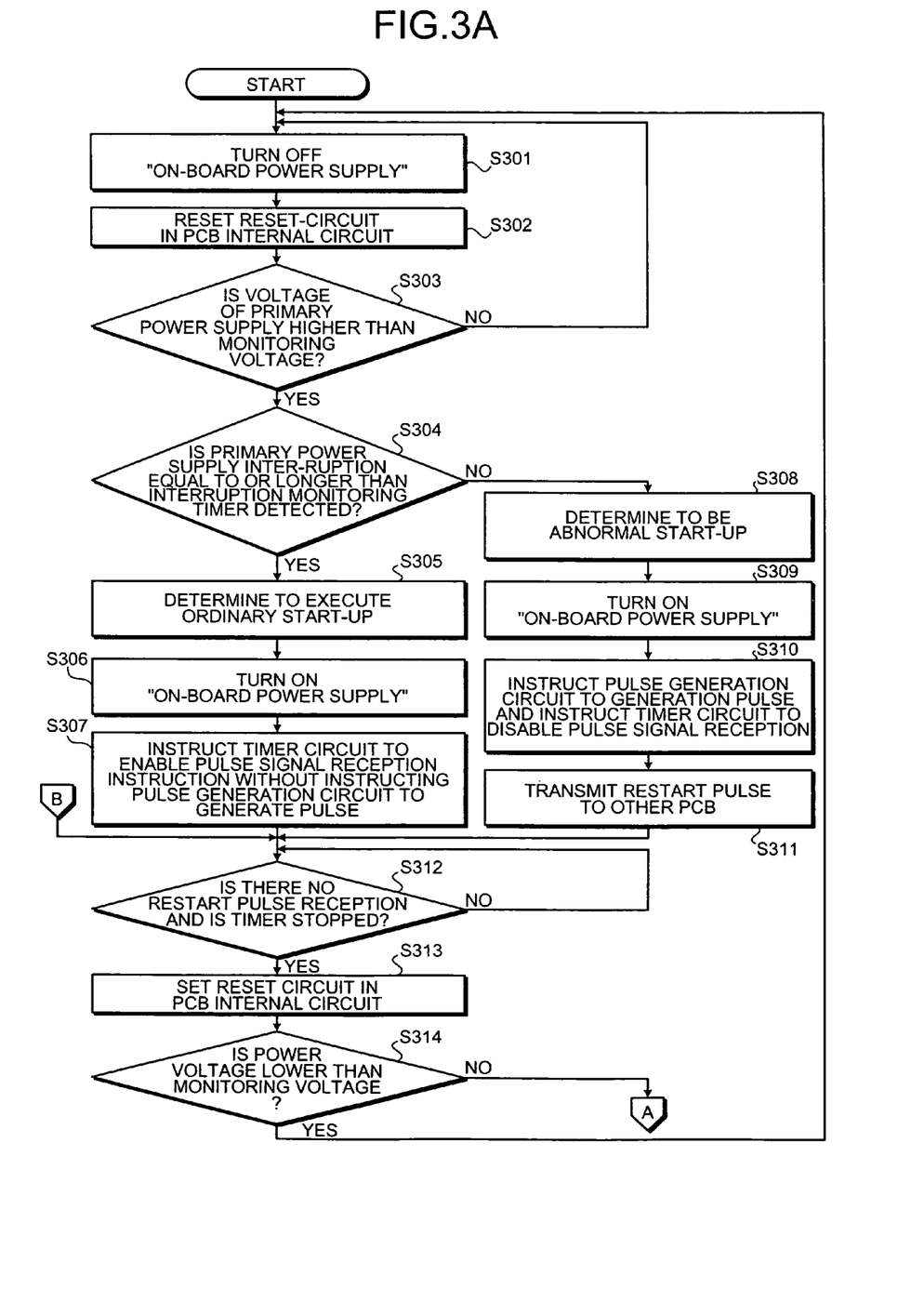
FIG. 3A is a flowchart of an operation of the distributed power supply.
Figure 3B:
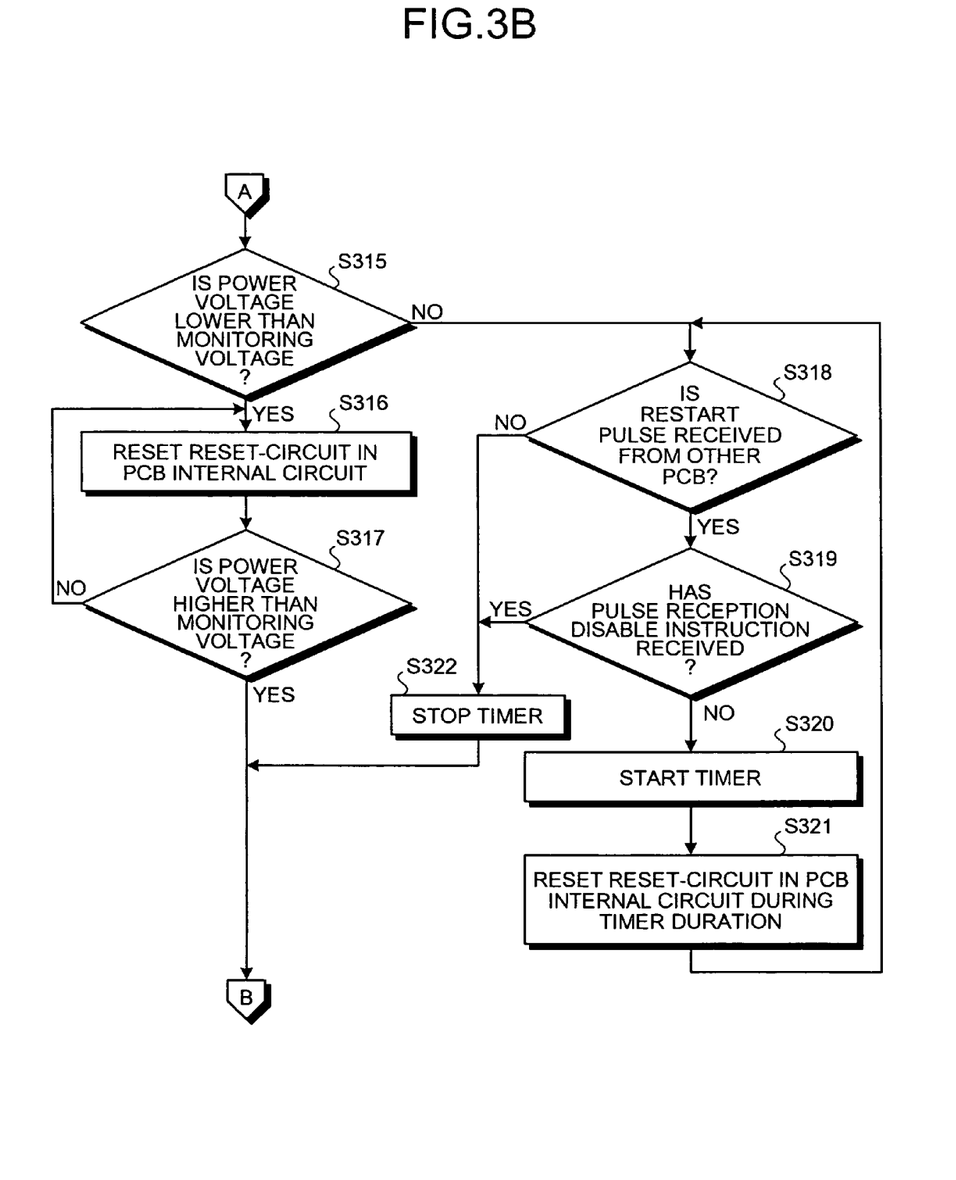
FIG. 3B is a flowchart of the operation of the distributed power supply.

FIG. 3A and FIG. 3B are flowcharts of operations of the distributed power supply. First, the primary power supply monitoring circuit 104 turns OFF the on-board power supply 103 (stop power supply) (Step S301). The primary power supply monitoring circuit 104 resets (RESET) the reset circuit (not shown) in the PCB internal circuit 120 (Step S302). Then, the primary power supply monitoring circuit 104 determines whether the power voltage of the primary power supply is higher than a predetermined monitoring voltage (Step S303). If the voltage of the primary power supply is lower than the predetermined monitoring voltage (Step S303: NO), the process returns to Step S301. At the same time, if the voltage of the primary power supply is higher than the predetermined monitoring voltage, (Step S303: YES), the process proceeds to Step 304.

At Step S304, when the interruption detection circuit 202 detects a primary power supply interruption that is equal to or more than the timer duration of the interruption monitor timer 201 (Step S304: YES), the process proceeds to Step S305. If the detected primary power supply interruption is less than the timer duration of the interruption monitor timer 201 (Step S304: NO), the process proceeds to Step S308.

In the process at Step S305, the interruption detection circuit 202 detects the interruption (determined to be an ordinary start-up) by the detection of the primary power supply interruption that is equal to or more than the timer duration of the interruption monitor timer 201 (Step S305). The primary power supply monitoring circuit 104 turns ON (supplies power to) the on-board power supply 103 (Step S306). Then, based on absence of power supply abnormality, the start-up circuit 203 does not instruct the pulse generation circuit 204 to generate the power supply abnormality detection pulse generation instruction and instructs the timer circuit 211 to enable pulse signal reception (Step S307). Subsequently, the process proceeds to Step S312.

In the process at Step 308, the interruption detection circuit 202 does not detect the interruption (determined to be an abnormal start-up) because the primary power supply interruption that is equal to or more than the timer duration of the interruption monitor timer 201 is not detected (Step S308). The primary power supply monitoring circuit 104 turns ON (supplies power to) the on-board power supply 103 (Step S309). Then, based on the detection of the power supply abnormality, the start-up circuit 203 instructs the pulse generation circuit 204 to generate the power supply abnormality detection pulse generation instruction and instructs the timer circuit 211 to disable pulse signal reception (Step S310). The pulse generation circuit 204 transmits the restart pulse P to another PCB, via the abnormality detection signal line L (Step S311). Subsequently, the process proceeds to Step S312.

After the process at Step S307 or Step S311, the OR circuit 212 determines whether the restart pulse P is not received and the timer of the timer circuit 211 is stopped (Step S312). If the restart pulse P is not received and the timer of the timer circuit 211 is not stopped (Step S312: NO), the current state is maintained. At the same time, if the restart pulse P is received (Step S312: YES), the reset circuit (not shown) within the PCB internal circuit 120 is set (SET) (Step S313). Then, the primary power supply monitoring circuit 104 determines whether the power voltage of the primary power supply is lower than the monitoring voltage (Step S314). If the power voltage of the primary power supply is lower than the monitoring voltage (Step S314: YES), the process returns to Step S301 and the processes subsequent to Step S301 are executed. At the same time, if the power voltage of the primary power supply is not lower than the monitoring voltage (Step S314: NO), the processes subsequent to Step S315, shown in FIG. 3B, are executed.

At Step S315, the PCB internal power supply monitoring circuit 213 judges whether the power voltage of the secondary power supply is lower than the monitoring voltage (Step S315). If the power voltage of the secondary power supply is lower than the monitoring voltage, as the result of this judgment (Step S315: YES), the process at Step S316 is executed. If the power voltage of the secondary power supply is not lower than the monitoring voltage (Step S315: NO), the process at Step S318 is executed.

At Step S316, after the reset circuit within the PCB internal circuit 120 is reset (RESET) (Step S316), the PCB internal power supply monitoring circuit 213 determines whether the power voltage of the secondary power supply is higher than the monitoring voltage (Step S317). If the power voltage of the secondary power supply is higher than the monitoring voltage (Step S317: YES), the process returns to Step 312 (see FIG. 3A). If the power voltage of the secondary power supply is not higher than the monitoring voltage (Step S317: NO), the process at Step 316 is executed again.

At Step S318, the pulse detection circuit 210 detects whether the restart pulse P is received from another PCB. If the restart pulse P is received from another PCB (Step S318: YES), and the pulse reception disable instruction is not received from the timer circuit 211 (Step S319: NO), the timer circuit 211 starts the timer (Step S320). The reset circuit in the PCB internal circuit 120 is RESET during the timer duration (Step S321), and the process returns to Step S318.

On the other hand, if the restart pulse P is not received from another PCB (Step S318: NO), or if the pulse reception disable instruction is received from the timer circuit 211 (Step S319: YES), the timer circuit 211 stops the timer (Step S322) and the process proceeds to S312 (see FIG. 3A).

Figure 4:
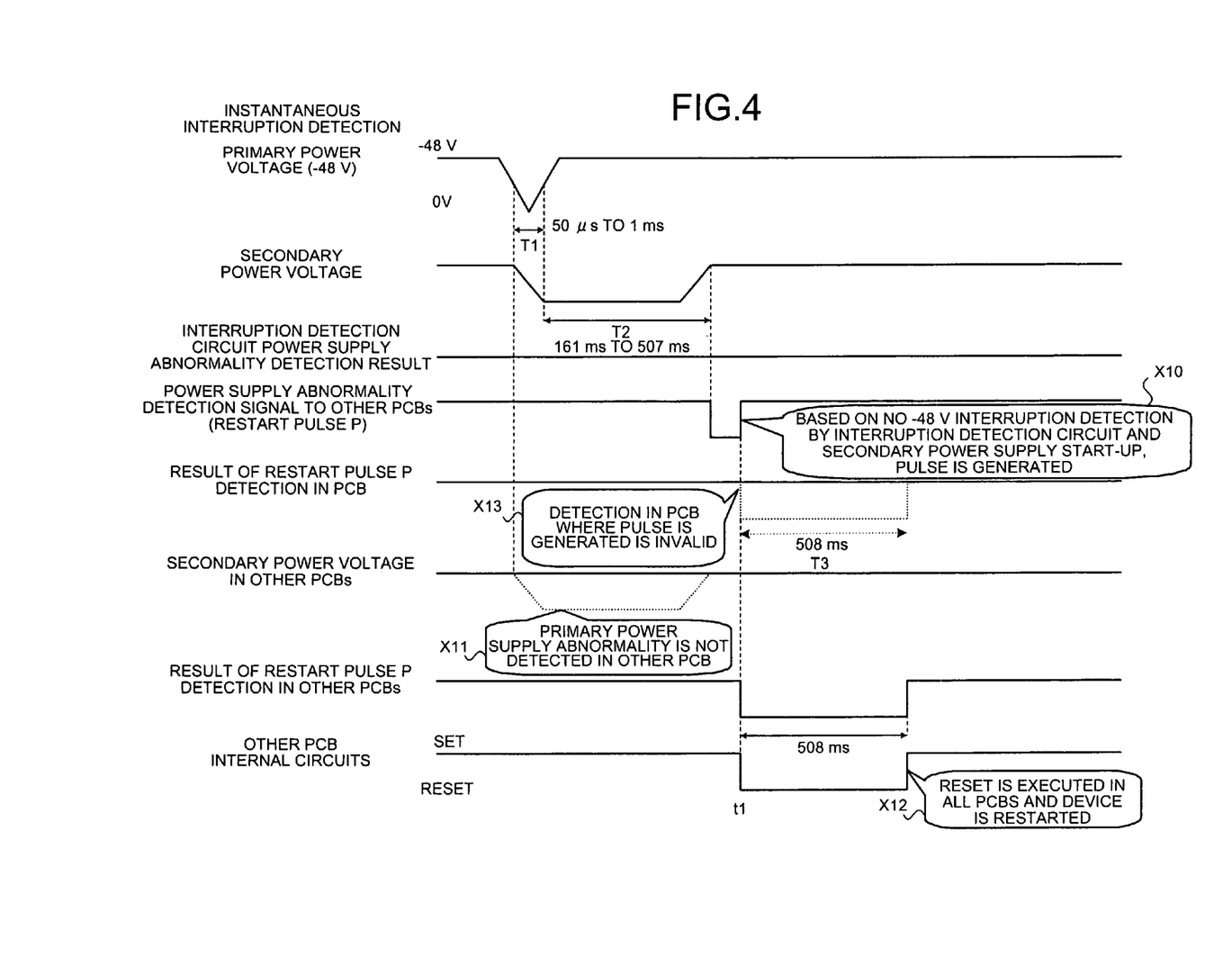
FIG. 4 is a timing chart for explaining an operation of the distributed power supply at the time of detection of an instantaneous power interruption.

FIG. 4 is a timing chart for explaining an operation of the distributed power supply during an instantaneous interruption detection. If the instantaneous interruption occurs for a time (T1) that is equal to or more than the detectable time and less than the predetermined time in the power voltage of the primary power supply, the PCB detects the instantaneous interruption, restarts the secondary power supply (restart time T2) normally, and supplies power. At this time, the interruption detection circuit 202 monitors and detects the ordinary start-up. However, because the interruption time is short, the interruption is not detected as an ordinary interruption (ordinary start-up). The secondary power supply starts while the start-up circuit 203 is not detecting the ordinary start-up. Thus, the current start-up is considered to be an abnormal start-up and a power supply abnormality detection pulse signal is transmitted to another PCB (X10). At this time, the instantaneous interruption is not detected (primary power supply abnormality) in the other PCB (X11), and the other PCB does not execute the reset (RESET) at this stage.

However, in the other PCB, the reset pulse P is input as the primary power voltage abnormality detection signal from the restarted PCB, via the abnormality detection signal line L. The other PCB resets and restarts the PCB internal circuit 120 when the restart pulse P is detected (time t1) (X12).

When more than one of other PCBs detects the same power supply interruption as the power supply abnormality during the restart pulse P detection, plural restart pulses P are detected. This may cause repeated restarts. Similarly, when the restart pulse P transmitted from the PCB is received by the same PCB (X13), repeated restarts may occur. To eliminate this phenomenon, the received restart pulse P is set to be ignored during the timer duration T3 that has a length of at least the time T2, in which the on-board power supply 103 is started once, and the restart is performed.

Because the other PCBs include the control system PCB, the transmission device can be restarted by the control system PCB. The control system PCB can reconfigure the operation state of the restarted controlled system PCB, and the restarted controlled system PCB can recover the service.

Figure 5:
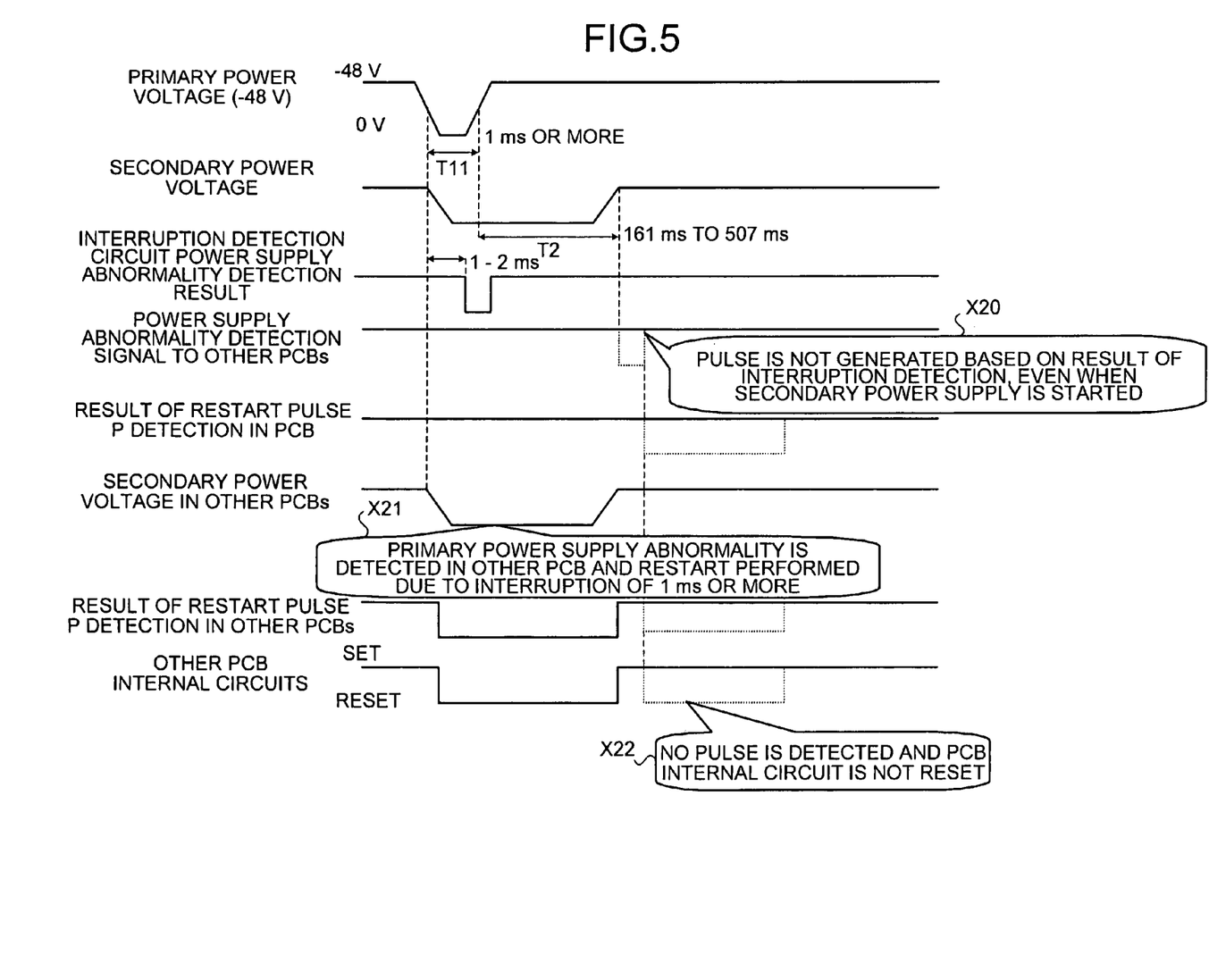
FIG. 5 is a timing chart for explaining an operation of the distributed power supply at the time of detection of an instantaneous power interruption.

FIG. 5 is a timing chart for explaining an operation of the distributed power supply during an ordinary interruption detection. When the instantaneous interruption of a time (T11) occurs, the PCB detects the instantaneous interruption. The time (T11) is equal to or more than the predetermined time. The secondary power supply (power voltage) is also restarted normally, and the power is supplied to the PCB internal circuit 120. At this time, the interruption detection circuit 202 can detect the ordinary start-up because the interruption time is long. The start-up circuit 203 starts the secondary power supply while the ordinary start-up is detected. Therefore, the start-up circuit 203 judges the current start-up to be the ordinary start-up and does not transmit the power supply abnormality detection signal (restart pulse) P to other PCBs (X20).

In addition, the instantaneous interruption is simultaneously detected in the other PCBs, and the other PCBs also perform a reset (X21). The restart pulse P is not input into the other PCBs from the restarted PCB, via the abnormality detection signal line L. When the restart pulse P is not detected as such, the PCB internal circuit 120 is not reset (X22), and unnecessary restarts are eliminated.

A process during an ordinary device power ON is similarly performed as the process shown in FIG. 5. The PCB detects the power supply interruption due to the interruption of duration that is equal to or more than the predetermined time (for example, T11). The secondary power supply is also restarted normally, and the power is supplied to the PCB internal circuit 120. At this time, the interruption detection circuit 202 detects the ordinary start-up because the interruption time is long. Subsequently, the secondary power supply (power voltage) is started up while the ordinary start-up is detected. Therefore, the current start-up is determined to be the ordinary start-up, and the power voltage abnormality detection signal (restart pulse) P is not transmitted to other PCBs. At this time, the instantaneous interruption is detected in the other PCBs and the reset is also performed in the other PCBs. The power supply abnormality detection signal (restart pulse) P is not input into the other PCBs from the restarted PCB, via the abnormality detection signal line L. When the restart pulse P is not detected, the PCB internal circuit 120 is not reset, and therefore, unnecessary restarts are eliminated.

Furthermore, a process when the PCB is hot-inserted is also similarly performed as the process shown in FIG. 5. The PCB detects the power supply interruption due to the interruption of a duration that is equal to or more than the predetermined time (for example, T11). The secondary power supply is also restarted normally, and the power is supplied to the PCB internal circuit 120. At this time, the interruption detection circuit 202 detects the ordinary start-up because the interruption time is long. Subsequently, the secondary power supply (power voltage) is started up while the ordinary start-up is detected. Therefore, the current start-up is determined to be the ordinary start-up, and the power voltage abnormality detection signal (restart pulse) P is not transmitted to other PCBs. At this time, the other PCBs are in ordinary operation. The power supply interruption is not detected and the reset is not executed in the other PCBs. The power supply abnormality detection signal (restart pulse) P is not input into the other PCBs from the restarted PCB, via the abnormality detection signal line L. When the restart pulse P is not detected, the PCB internal circuit 120 is not reset. Unnecessary restarts are not executed, and therefore, a service is not to be down.

According to the above-described configuration, the control system PCB 110 is not required to individually monitor the restart states of the controlled system PCB1 (101) and the controlled system PCB2 (102). Only one abnormality detection signal line L is laid between the controlled system PCB1 (101), the controlled system PCB2 (102), and the control system PCB 110. Therefore, the controlled system PCB1 (101) and the controlled system PCB2 (102) are not required to notify the control system PCB 110 of the start-up status, via a dedicated monitoring control line. In addition, it is not necessary to provide a dedicated monitoring control line for each controlled system PCB1 (101) and controlled system PCB2 (102), between the control system PCB 110, the controlled system PCB1 (101) and the controlled system PCB2 (102).

According to the embodiments described above, even when only some of the PCBs (the controlled system PCBs, above) perform the restart due to the instantaneous interruption in the primary power supply and the control system does not execute the restart, the restarted PCB outputs the restart pulse P to the other PCBs. Therefore, all PCBs installed in the transmission device can execute the restart. The control system PCB that monitors and controls the overall device can reconfigure the restarted controlled system PCB for a normal operation.

The restart pulse is transmitted to all PCBs within the transmission device, via the abnormality detection signal line L. Therefore, all PCBs within the transmission device can be restarted, regardless of the number of PCBs, when the instantaneous interruption of a time (T1) occurs in the power voltage of the primary power supply. The time (T1) is equal to or more than the detectable time and less than the predetermined time. The abnormality detection signal line L can be arranged by simply assigning an unused bus line that is already provided within the transmission device.

In the primary power supply monitoring, it is provided that the power supply interruptions equal to or more than the predetermined time (for example, 1 ms) are always detected and the entire transmission device is stopped. At the power supply interruptions that are less than the detectable time (for example, 51.2 µs), it is difficult to operate to stop the transmission device due to limitation of circuits and the like. With regards to the instantaneous interruptions that occur within a time range, from the detectable time to the predetermined time, conventionally, whether each PCB stops depends on the individual differences, such as the capacitor elements of each PCB. Therefore, some PCBs stop and restart, and some other PCBs continue running without stopping. According to the embodiments above, if even one PCB restarts, the other PCBs can be restarted. All PCBs in the transmission device can restart in cooperation.

In the method in which the control system PCB individually monitors the restart status of each controlled system PCB, conventionally, the dedicated monitoring control lines were required between the control system and each controlled system PCB. According to the embodiments above, the restart pulse P can be transmitted to each PCB, using a single common abnormality detection signal line L. Therefore, the size of the circuit for monitoring can be reduced, compared to the conventional method.

The interruption monitoring timer 201 is set to a value exceeding 1 ms (2 ms in the configuration example, above) to detect ordinary interruptions, excluding instantaneous interruptions (50 µs to 1 ms). However, the timer value set in the interruption monitoring timer 201 is arbitrarily set. The instantaneous interruptions can be detected if the timer value is set to a value included within the range of the instantaneous interruption, and equal to or more than the instantaneous interruption detectable time (for example, 51.2 µs).

In the embodiments above, an example in which the distributed power supply of the invention is applied to the transmission device. However, it is not limited to transmission devices. The distributed power supply can be similarly applied to various devices that include a plurality of PCBs to which power is supplied, respectively, by the distributed power supply method.

According to the embodiments described above, it is possible to stably recover a service provided by a device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed power supply incorporated in a device including a plurality of units, comprising:
   an on-board power supply configured to individually supply a secondary power to each of the units using a primary power supplied to the on-board power supply;
   an abnormality detecting unit configured to detect abnormality in a voltage of the primary power;
   a restarting unit configured to restart a corresponding unit when the abnormality detecting unit detects the abnormality; and a transmitting unit configured to transmit a restart signal to other units when the abnormality detecting unit detects the abnormality.

2. The distributed power supply according to claim 1, wherein
the restart signal is transmitted through a common line to which the units are connected, and
the other units are restarted based on the restart signal.

3. The distributed power supply according to claim 1, further comprising:
a timer provided for each of the units, the timer to which a time to detect a power interruption that occurs in a predetermined unit time is set; and
an interruption detecting unit configured to detect power interruption corresponding to the time set in the timer.

4. The distributed power supply according to claim 3, further comprising an restart determining unit configured to determine whether to generate the restart signal, based on presence or absence of the power interruption detected by the interruption detecting unit and a start-up status of the on-board power supply, wherein
the transmitting unit is configured to generate a pulse as the restart signal and to transmit the pulse to other units when the restart determining unit determines to generate the restart signal.

5. The distributed power supply according to claim 1, further comprising:
a receiving unit configured to receive the restart signal from another unit; and
a timer unit configured to disable reception of the restart signal transmitted to the other units from the transmitting unit for a predetermined time such that only the restart signal received is extracted.

6. The distributed power supply according to claim 5, wherein the restarting unit is configured to restart the unit based on a logical OR of a voltage of the secondary power and the restart signal received by the receiving unit.

7. A method of recovering a distributed power supply from an error, the distributed power supply incorporated in a device including a plurality of units, and including an on-board power supply configured to individually supply a secondary power to each of the units using a primary power supplied to the on-board power supply, the method comprising:
detecting abnormality in a voltage of the primary power;
restarting a corresponding unit when the abnormality is detected at the detecting; and
transmitting a restart signal to other units when the abnormality is detected at the detecting abnormality.

8. The method according to claim 7, wherein
the restart signal is transmitted through a common line to which the units are connected, and
the other units are restarted based on the restart signal.

9. The method according to claim 7, further comprising
setting a time to detect a power interruption that occurs in a predetermined unit time in a timer provided for each of the units; and
detecting power interruption corresponding to the time set in the timer.

10. The method according to claim 9, further comprising determining whether to generate the restart signal, based on presence or absence of the power interruption detected at the detecting power interruption and a start-up status of the on-board power supply, wherein
the restart signal is a pulse generated when it is determined to generate the restart signal at the determining.

11. The method according to claim 7, further comprising:
receiving the restart signal from another unit; and
disabling reception of the restart signal transmitted to the other units at the transmitting for a predetermined time such that only the restart signal received at the receiving is extracted.

12. The method according to claim 11, wherein the restarting includes restarting the unit based on a logical OR of a voltage of the secondary power and the restart signal received at the receiving.

* * * * *